Feb. 6, 1968   A. E. NEWTON ET AL   3,367,166
PULL-TO-SET RIVETERS HAVING AUTOMATIC FEED MEANS
Filed July 12, 1965   7 Sheets-Sheet 1
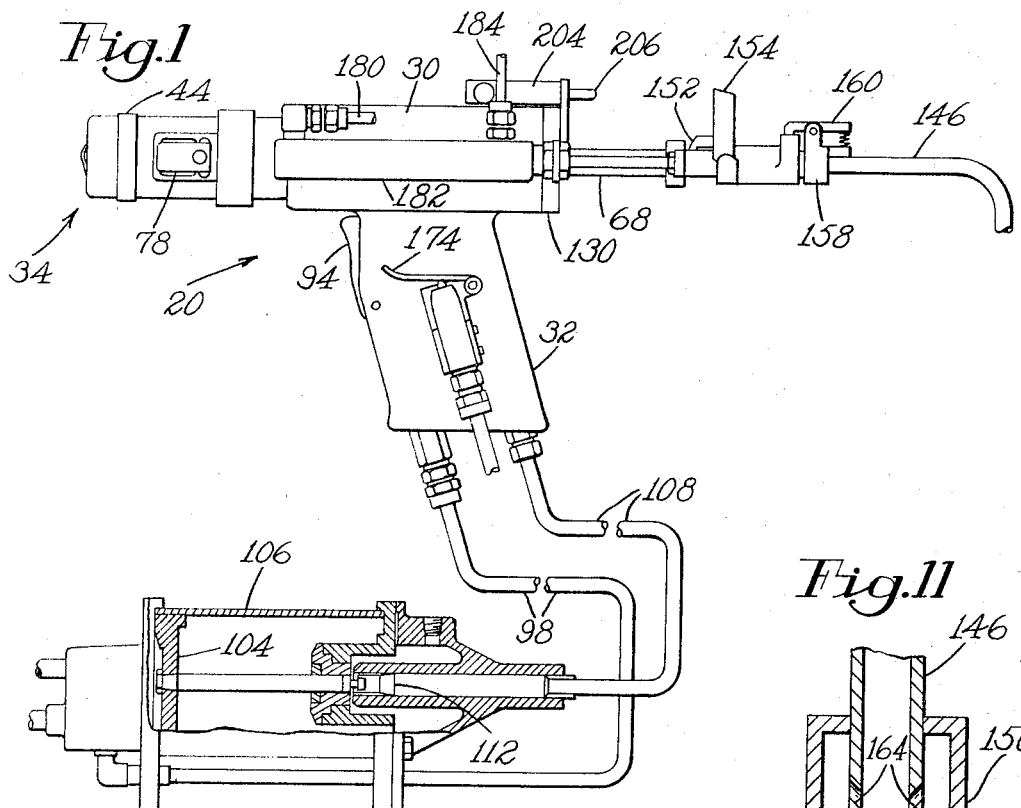
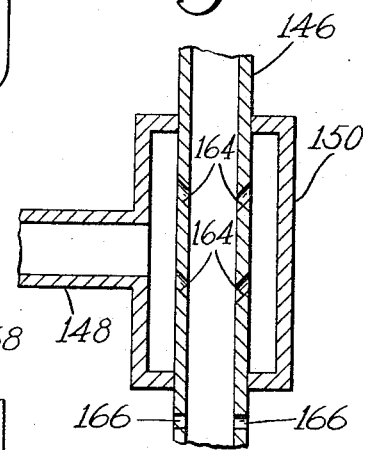
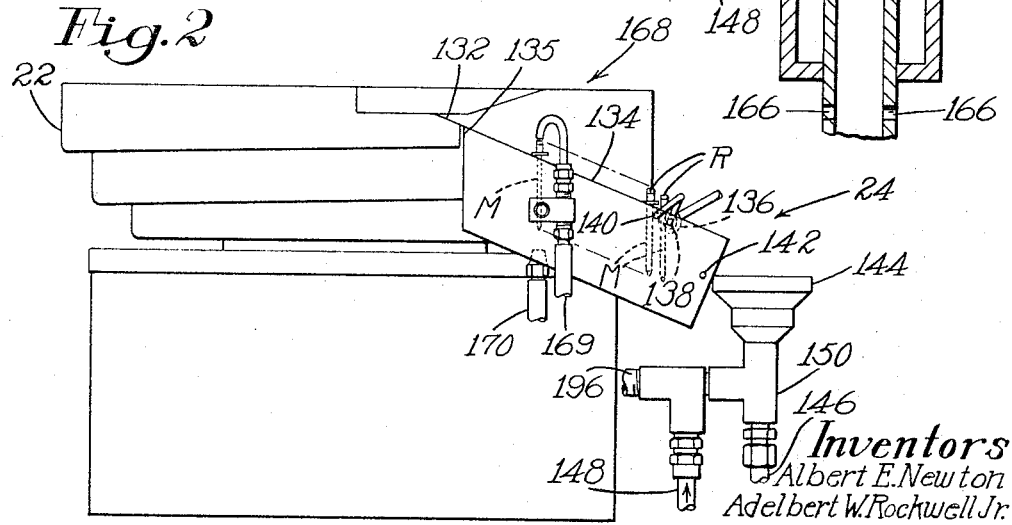
Inventors
Albert E. Newton
Adelbert W. Rockwell Jr.
By their Attorney
Carl E. Johnson

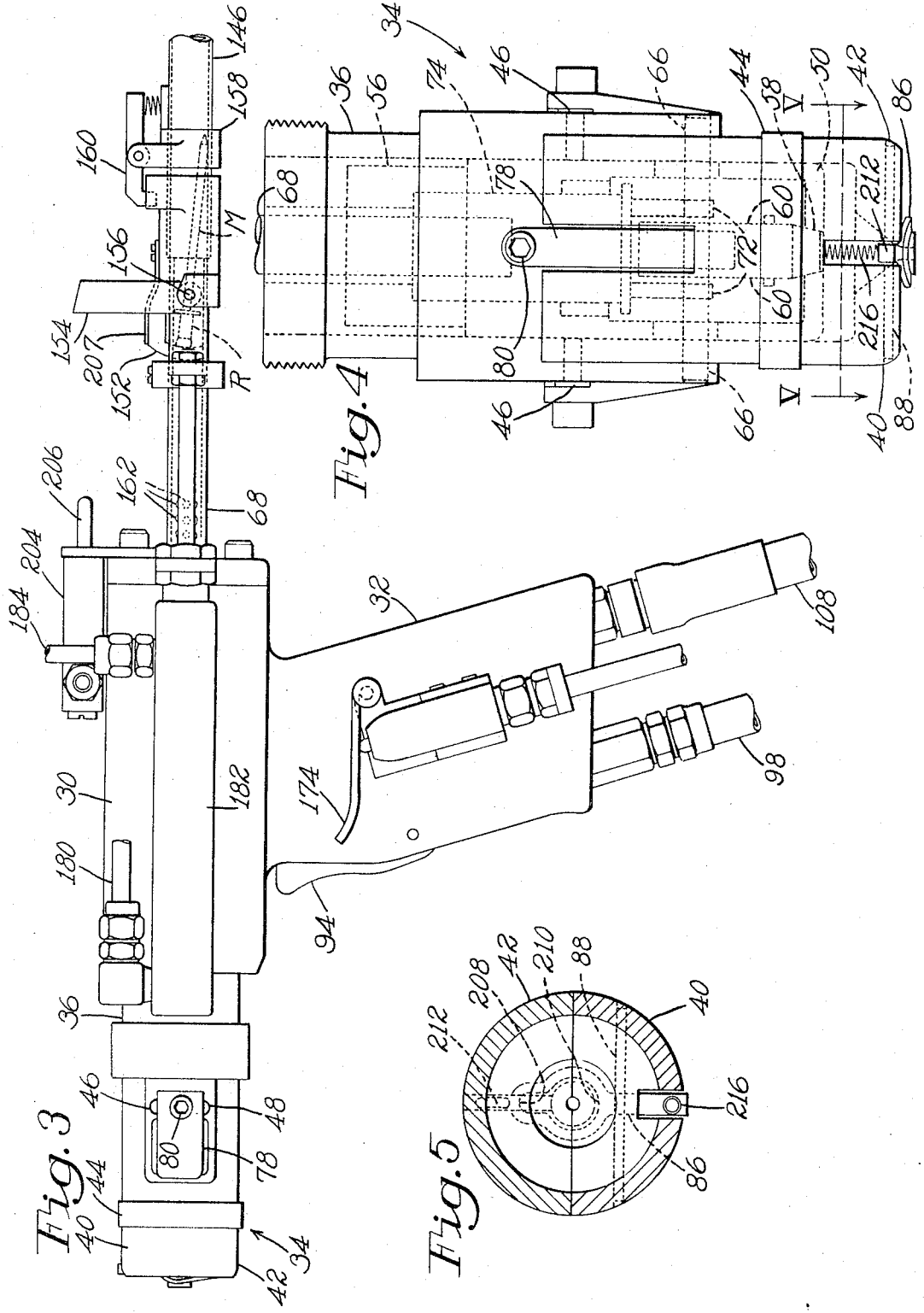

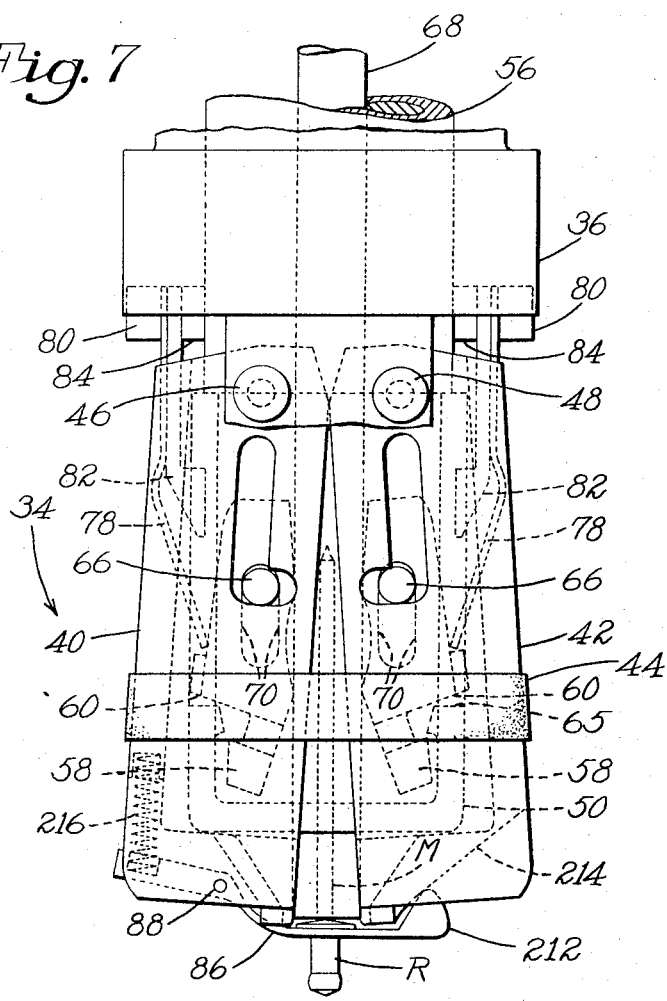

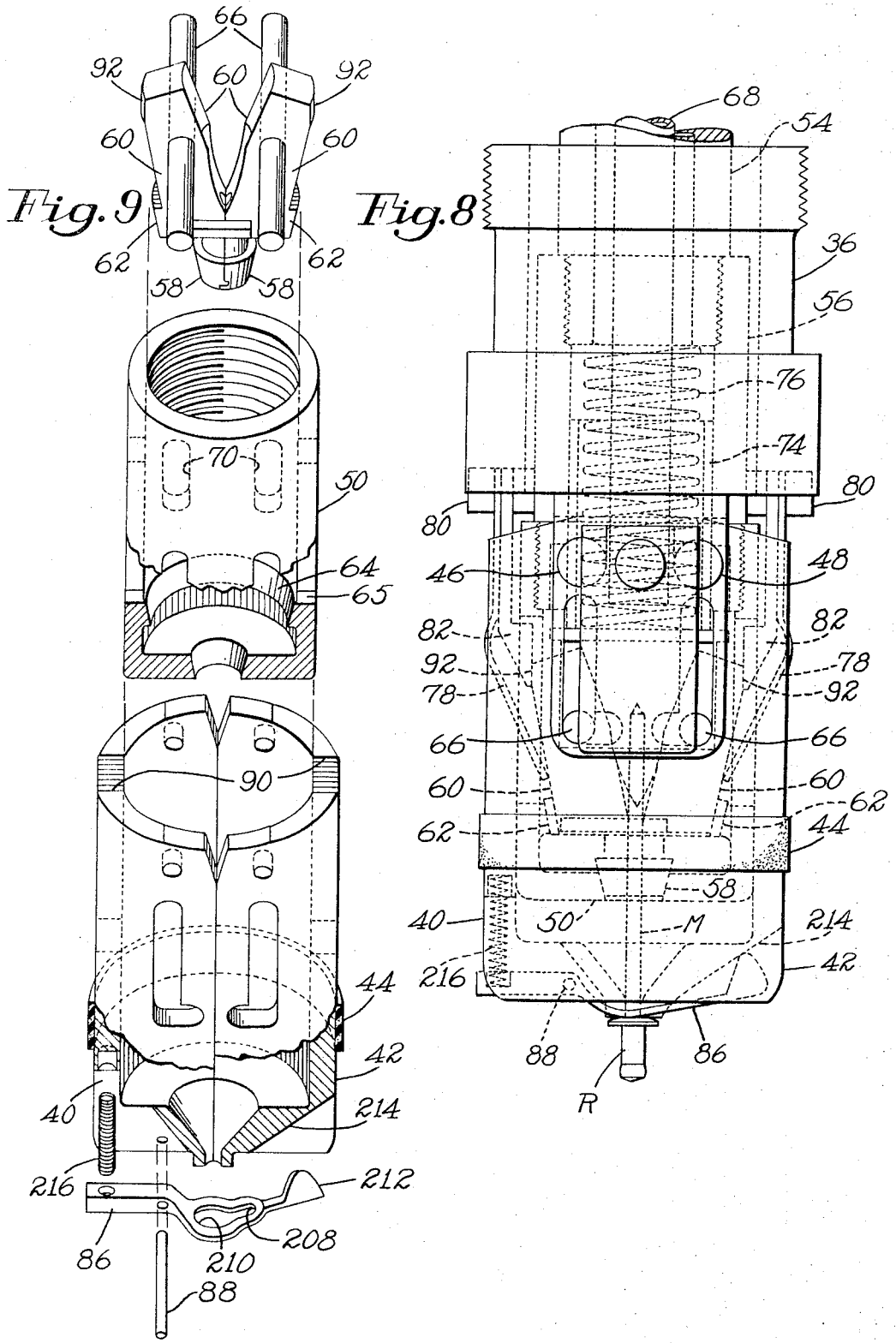

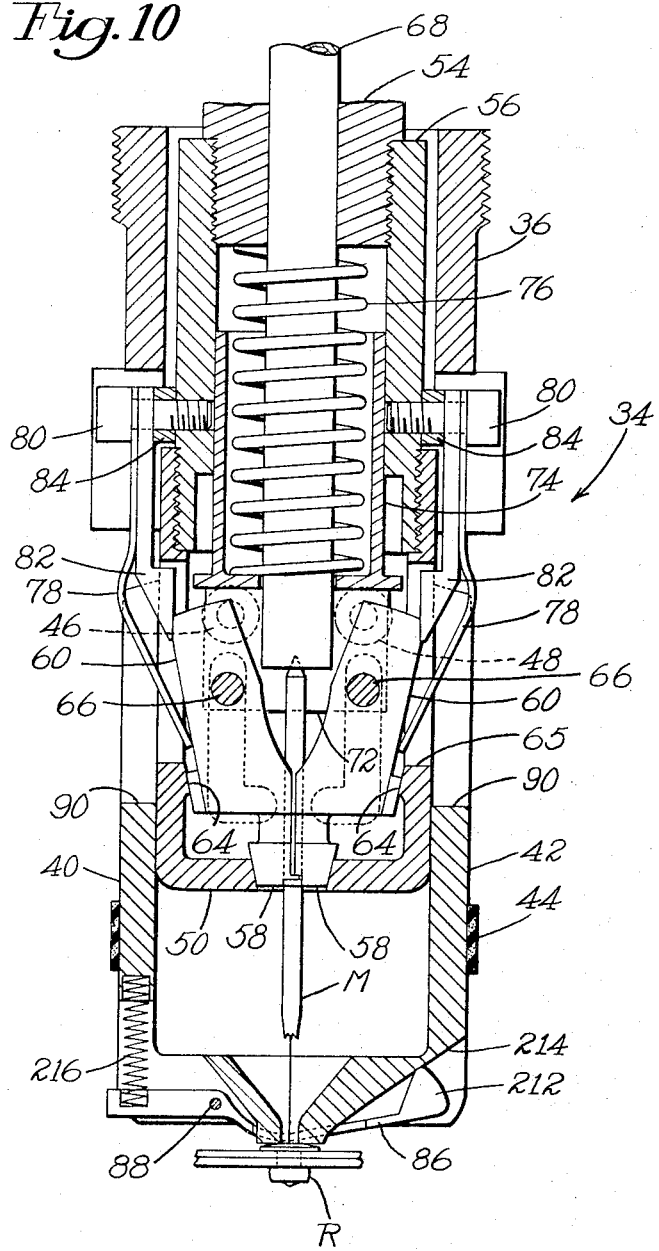

United States Patent Office 3,367,166
Patented Feb. 6, 1968

3,367,166
PULL-TO-SET RIVETERS HAVING AUTOMATIC
FEED MEANS
Albert E. Newton, Beverly, and Adelbert W. Rockwell,
Jr., Gloucester, Mass., assignors to United Shoe Machinery Corporation, Flemington, N.J., and Boston, Mass.,
a corporation of New Jersey
Filed July 12, 1965, Ser. No. 471,293
21 Claims. (Cl. 72—391)

This invention relates to fastener inserting tools, and more especially to power operated tools for successively installing blind fasteners, for instance those of the separable mandrel or pull-to-set type. A fastener of this sort is inserted and secured from the same side of a work piece. One such fastener with which the invention is concerned, though not exclusively, comprises a nail-like mandrel and a preflanged tubular rivet thereon. While the invention is herein illustrated as embodied in a power tool for feeding and setting these mandrel-riveting assemblies, it will be appreciated that in various respects usage of the invention is not thus limited nor are the features of the invention restricted to the illustrated construction.

Pull-to-set rivets have found a widening market. For industrial applications several designs of power driven inserting tools have been provided. Their convenience in use and their productive operating rates can be considerably increased, it is recognized, when they can be automatically supplied with the successive fasteners to be installed. So far as now known, available tools are only adapted to receive successive blind fasteners as they are individually thrust by hand into a tool. It accordingly is a primary object of this invention to provide an easily operated, automatically fed tool for rapidly installing pull-to-set fasteners.

Another object of this invention is to provide separable mandrel rivet setting apparatus having power means under the control of an operator for gripping and tensioning sucessive mandrel shanks of the rivets to be set and other power means under control of the operator for delivering the successive mandrel rivets from a supply and into position to be operated on by the gripping and tensioning means.

To these ends, and in accordance with a feature of the invention, the illustrative tool comprises a hollow body having an anvil end, means for releasably retaining in the anvil end in rivet projecting position a separable mandrel rivet to be set, a pair of cooperative jaws in the body for gripping and tensioning the stem of the mandrel so retained, and means for delivering successive mandrel rivets from a supply and into the tool in position to be retained by the rivet retaining means for operation thereon by the jaws. As herein illustrated fluid pressure operated means, preferably hydraulic and controlled by a first movable element of the tool, is employed to operate the jaws to pull the mandrel stem away from the anvil portion of the tool until tension in the mandrel has set its rivet and then broken off an expendable part of the stem.

Advantageously and according to another feature of the invention actuation of the mentioned first movable element is simultaneously effective to signal for delivery from a supply source the next mandrel rivet to be set, a separator mechanism associated with the tool being rendered operative to properly orient this next rivet for delivery to the tool in a position adjacent to the hydraulic jaw operating means. As also shown in the exemplary tool other novel fluid pressure means, preferably pneumatic and responsive to a second movable element of the tool, ejects the expendable mandrel stem through the anvil nose of the tool in a non-dangerous manner after opening the jaws, and thereupon at reduced pressure moves endwise the next mandrel rivet to be set into operative position between the jaws as determined by the retaining means. A further movement by the operator of the second element referred to shifts the retaining means to an out-of-the-way position so that the tool may now be operated in any oriented position, the jaws serving to prevent premature release of the unset rivet assembly.

The above and other features of the invention together with the novel details and combinations of parts including interlocking means, will now be more particularly described in connection with an illustrative fastener tool and with reference to the accompanying drawings thereof, in which FIG. 1 is a view in side elevation of a hand-held mandrel rivet gun, its pneumatic controls with rivet gate, and its hydraulic controls, an intensifier portion of the latter being shown partly in section;

FIG. 2 is a view in side elevation of feeder mechanism adapted for supplying oriented mandrel rivets singly as directed and when required by the pneumatic controls of the gun;

FIG. 3 is an enlarged view of the gun shown in FIG. 1 while at rest but with a mandrel rivet at the rivet gate;

FIG. 4 is a further enlarged view of the nose portion of the gun shown in FIGS. 1 and 3, but turned 90° about its axis;

FIG. 5 is a section taken on the line V—V of FIG. 4 and showing mandrel rivet retaining means;

FIG. 7 is an enlarged view of the nose portion of the gun as seen in FIG. 3, its jaw and retainer mechanism open and receiving a mandrel rivet from a delivering tube shown in FIG. 6;

FIG. 8 is a view similar to FIG. 7 but showing the parts at a subsequent stage in the cycle of operations when the tool is ready to insert the rivet to be set in a work piece;

FIG. 9 is an exploded perspective, with portions broken away, of certain nose assembly parts;

FIG. 10 is an axial sectional view corresponding to FIG. 8 but showing the parts in a subsequent stage when the rivet has been set and the mandrel stem broken;

FIG. 11 is a detail view in section of the rivet feed velocity booster chamber shown in FIG. 2.

The illustrative fastener apparatus comprises a hand-held mandrel rivet gun 20 (FIGS. 1, 3 and 6), a vibratory bowl feeder 22 (FIG. 2) providing a supply of fasteners, separator means 24 associated therewith, and fluid pressure means under the control of an operator including a pneumatic system (FIG. 12) controlling the feeder and separator for cyclically feeding said successive oriented mandrel rivets from the feeder 22 to the gun 20, and a pneumo-hydraulic system (FIG. 1) for effecting insertions of the successive fasteners as will be described.

Figure 6:
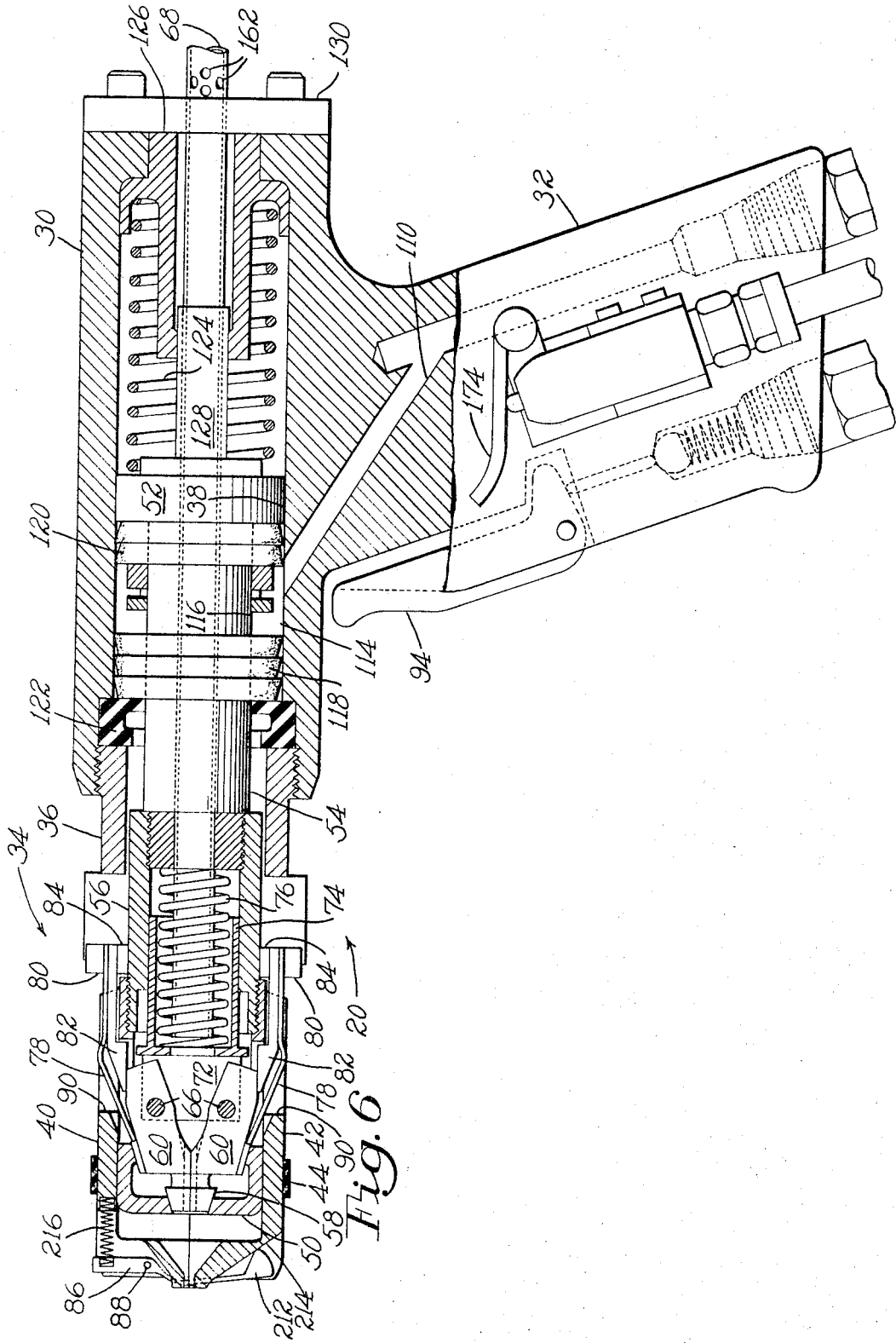
FIG. 6 is an axial section of the gun unloaded and with its mandrel gripping means closed.

The gun 20 is adapted to set mandrel rivets each consisting of a mandrel M (FIGS. 2, 3, 7 and 8) formed with a stem, the latter extending axially through a tubular rivet R one end of which is preflanged and spaced by the rivet barrel from the mandrel head. Referring more especially to FIG. 6, the gun has a main body 30 including a grip portion 32, and a nose assembly generally designated 34 (FIGS. 6–10) including a supporting sleeve 36 coaxially threaded into a cylindrical bore 38 formed in the body 30. The nose assembly 34 comprises a pair of outer, complemental anvil members 40, 42 (FIGS. 3, 4, 6–10) yieldably held closed by an elastomeric band 44 and respectively pivoted at their rearward ends by pairs of headed pins 46, 48 which extend through diametrically opposed portions of the sleeve 36. Internal nose portions of the members 40, 42 are conical to axially guide the rivets to be fed. Mounted for reciprocable axial operation within the anvil members 40, 42 is mandrel gripping and tensioning means to be explained including a hollow jaw cage 50 (FIGS. 4 and 6–10 inclusive), a piston 52, working in the bore 38 and having a piston rod 54, and a tubular extension 56 the threaded ends of which respectively receive the rod 54 and the cage 50. As indicated in FIGS. 4, 6, 8 and 9, the forward end of the cage 50 is formed with a conical aperture for receiving truncated conical portions 58, 58 of complemental mandrel gripping jaws 60, 60. Other conical portions 62 of the jaws are adapted to bear, when closed, on an internal shoulder 64 formed in the cage in order to insure mandrel gripping of a portion of the surface of the mandrel, this surface often being roughly cylindrical. To prevent the jaws 60 from turning about the tool axis, the cage 50 is formed with opposed axial slots 65 (FIGS. 9, 10) respectively, receiving rearward portions of the jaws.

In order to enable successive separable mandrel rivets to be automatically fed through the body 30 and into operative position in the nose assembly 34 by mechanism later described, the jaws 60 are pivotally supported, respectively, on pins 66, 66 (FIGS. 4 and 6–10) at opposite sides of the axial path of a fastener carrying tube 68 having further functions about to be explained. The pins 66 also serve to maintain the parts of the nose assembly in operative relation, and extend through the mentioned diametrically opposed portions of the sleeve 36, through axial slots 70, 70 (FIGS. 7, 9) in the cage 50, and through confronting projections 72, 72 of an axially slidable tubular member 74 urged forwardly by a preloaded spring 76 abutting a reduced end of the piston rod 54. The purpose of the spring 76 is to urge the jaws 60 forwardly into their closed position in the cage 50 as shown in FIGS. 6 and 8, such closure being aided, when the piston 52 is retracted, by a pair of opposed jaw-centering leaf springs 78, 78 (FIGS. 4 and 6–8) respectively, secured by screws 80, 80 extending through jaw guides 82, 82, spacers 84, 84 and threaded into the tubular extension 56.

The mandrel-rivet delivering tube 68 is axially moved during a cycle of operations by means subsequently to be described. For purposes of quick orientation it is noted that with the tool at rest as shown in FIG. 6, the tube 68 is retracted at the start of the cycle; that thereafter, in advancing toward the anvil end, the tube 68 serves, as indicated in FIG. 7, to cam open the jaws 60 and then the anvil members 40, 42 whereupon the nose assembly 34 is ready to receive a mandrel rivet from the tube acting as a fastener conduit; that next, as depicted in FIGS. 7 and 8, a rivet catcher 86 (FIGS. 4–9 inclusive) pivoted to the anvil member 40 by a pin 88 has positioned the delivered rivet endwise as will later be explained and the tube 68 has been retracted; and lastly, that the retracted tube 68 does not interfere with the mandrel tensioning, the nose assembly parts then occupying the relative positions shown in FIG. 10. The free ends of the leaf springs 78 project through axial slots 90 (FIGS. 9, 10) in the members 40, 42 respectively to bear on inclined sides of the jaws 60 thus to enable the delivered mandrel lightly to be gripped and the tool directed downwardly for rivet insertion, if desired, even though the piston has then been retracted as illustrated in FIG. 8. Flats 92 (FIGS. 8, 9) formed on outer portions of the jaws 60 are engageable with corresponding axial ways formed internally on the guides 82.

Figure 12:
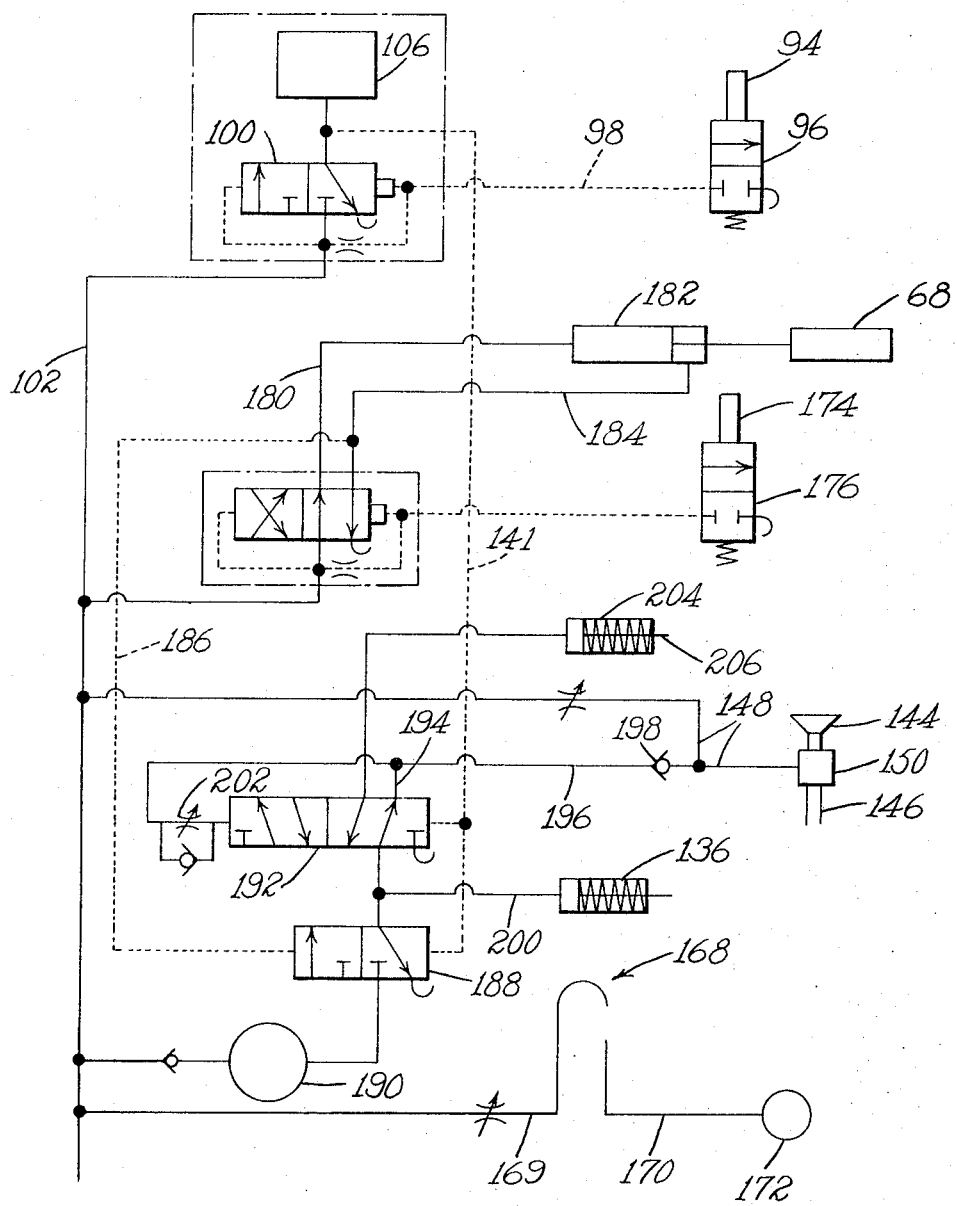
FIG. 12 is a schematic view of the fluid pressure control system.

Before continuing with the explanation of the automatic rivet delivering means associated with and controlled by the gun, fluid pressure means for operating the mandrel pulling piston 52 will be described. To this end a springpressed finger trigger 94 (FIGS. 1, 3, 6 and 12) pivoted in the grip 32 is manually depressed to shift a valve 96 (FIG. 12) to its exhaust position and, by means of a line 98 in the pneumatic control system, to permit a 2-way pilot valve 100 (FIG. 12) to be shifted from its exhaust position shown to effective connection with an inlet line 102 (FIGS. 1 and 12) connected to a source of air under pressure. Accordingly, air is admitted to the left side of a piston 104 (FIG. 1) in an intensifier cylinder 106 (FIGS. 1, 12). In response to consequent displacement of the piston rod of the piston 104, liquid such as oil in a line 108 connecting a port 110 (FIG. 6) of the tool with a side of a smaller piston 112 in the intensifier cylinder is subjected to high pressure in conventional manner. This pressurized oil is transmitted to an annular chamber 114 (FIG. 6) about a seal 116 in the bore 38. The seal 116 is between and abuts composite seals 118, 120 all of which slidably receive the pulling piston rod 54. Thus the increased hydraulic pressure in the bore 38 merely reacts on the seal 118 to compress a rubber packing ring 122 against the sleeve 36 but acts through the seal 120 to move the piston 52 to the right as seen in FIG. 6 for mandrel tension. This occurs against the resistance of a return spring 124 (FIG. 6) bearing endwise on a tubular guide 126 serving also as a piston stop and adapted telescopically to receive a piston pilot portion 128 within which the fastener carrying tube 68 slides. An end cap 130 secured to the gun body 30 also aids in axially guiding the tube 68.

Assuming as a starting condition that no mandrel rivet had yet been delivered to the nose assembly 34 by the carrying tube 68, the actuation of the finger trigger 94, in addition to potentially causing mandrel pulling as described, effectively performs the function of signalling the separator means 24 to deliver the next rivet to be installed. For this purpose a bulk supply of fasteners is contained in a source such as the bowl feeder 22 (FIG. 2) which, upon vibration in known manner, advances the mandrel rivets one-by-one, mandrel heads up, along an inclined inside shelf. Successive mandrel rivets emerge from an exit 132 to descend in single file in a stationary raceway 134, the rivet flanges riding on spaced sides (one only shown in FIG. 2) of the raceway and their mandrels being pendant therebetween. For optimum operation and continuous feeding it is preferable to provide a small gap 135 (on the order of 0.040–0.050″) between the exit 132 and the raceway 134. The separator means 24 includes an air cylinder 136 (FIGS. 2 and 12) having a spring return piston. The piston rod of this piston carries a separator wire providing a detent arm 138 for transversely engaging an endmost mandrel rivet in the raceway, and an offset retainer arm 140 which has been shaped slidably to extend into the opposite side of the raceway between the endmost and next-to-endmost mandrels. The arrangement is such that the depression of the finger trigger 94 through use of a pilot line 141 (FIG. 12) depressurizes the cylinder 136 to retract the arm 138 and thus releases the lowermost mandrel, and causes the next-to-lowermost to be intercepted by the arm 140. The lowermost mandrel rivet then descends to engage an up-ending pin 142 in the raceway whereupon the released mandrel rivet falls by gravity, rivet end first, into a funnel 144 (FIGS. 2, 12) constituting the mouth of a flexible delivery tube 146 (FIGS. 1, 2 and 3). The latter may be of a convenient length, for example on the order of 10 feet. As indicated in FIG. 12 air from the line 102 is continuously supplied via a line 148 to a rivet velocity booster chamber 150 (FIGS. 2, 11 and 12) disposed between the funnel 144 and the tube 146 to blow the mandrel rivet through the tube and into a stop position at the gun 20 as shown in FIG. 3. Here the mandrel head engages a spring-pressed projection 152 of a gate pivoted at 156 on the receiving end of the retracted carrying tube 68, the flexible tube 146 communicating with the tube 68 preferably by means of a quick disconnect coupling 158 utilizing a springpressed latch 160. In order to vent the fastener delivery tubing the tube 68 is formed with outlets 162 (FIGS. 3 and 6).

It is to be noted that the mandrel rivet is not stopped at the gate projection 152 by its engagement merely with the flange of the rivet. This is because such engagements at the high delivery speed may permit varying projection of the mandrel head from the rivet barrel and hence reduce the effective pulling stroke of the tool or even disassemble the fastener.

The fastener delivery system preferably includes other structural details found important. Within the velocity booster chamber 150 (FIG. 11) a vertical portion of the tube 146 is provided with a plurality of inclined holes 164 (FIG. 11) to direct a greater air flow downwardly than up into the funnel 144 thereby eliminating any valving or gates at this locality. Also, in addition to the vent holes 162 of the tube 68 (which are subsequently closed off in a cycle by the internal wall of the bore in the piston rod 54), a bleeder hole 166 (FIG. 11) in the tube 146 beneath the chamber 150 was found to be very desirable in attaining proper air flow. In order to insure that mandrel rivets do not jam between the vibratory feeder 22 and the stationary raceway 134, a detecting device generally designated 168 (FIGS. 2 and 12) is used. For this purpose a line 169 connected to the line 102 directs a constant stream of air downwardly between the raceway side plates and toward a line 170 arranged beneath the mandrel path and having a pressure sensitive switch 172. The latter is actuated to deenergize the vibratory feeder 22 when the raceway 134 has been supplied with mandrel rivets above th separator sufficiently to interrupt the jet emitted from the line 169. As soon as one or two rivets are thereafter released by the separator 24 the pressure flow to the line 170 is restored and the bowl feeder resumes operation.

With the tool in the condition shown in FIG. 3, the operator next depresses a thumb trigger 174 (FIGS. 1, 3 and 12) mounted on the side of the tool grip portion 32. This shifts a valve 176 (FIG. 12) to its exhaust position and thereby moves a valve 178 to the right as viewed in FIG. 12. Consequently, although a line 180 (FIGS. 3 and 12) connecting a double acting cylinder 182 on the gun 20 to the supply line 102 had maintained the carrier tube 68 retracted, the line 180 is now connected to exhaust, and a line 184 to the opposite side of the piston in the cylinder 182 is now pressurized to advance the tube 68 into the tool to cam open the jaws 60 and the anvil members 40, 42 as shown in FIG. 7. At the same time a line 186 (FIG. 12) connected to the line 184 is pressurized to shift a valve 188 (FIG. 12) from its exhaust position. As a consequence when the carrier tube 68 is fully forward and would have released an unpulled or expendable mandrel stem (had there been one broken as shown in FIG. 10) from the jaws 60, a short blast of air from an accumulator 190 passes through the valve 188, a valve 192 (FIG. 12), lines 194, 196 and a check valve 198 to the feed line 146 via the booster chamber 150. This blast bypasses the mandrel rivet held at the gate projection 152 and, the carrier tube outlets 162 now being blocked, the blast continues through the nose assembly 34 to eject the broken mandrel or mandrel rivet (if there be one) axially from the tool. The ejecting force is only sufficient to expel the stem with low speed and is therefore not harmful. During the expulsion blast a line 200 (FIG. 12) communicating with the separator cylinder 136 is pressurized to move the separator arm 140 transversely of the raceway and permit the mandrel rivet that had been retained thereby to slide down to the lowermost position for detention by the lower escapement arm 138. The lowermost fastener is thus held until the finger trigger 94 is actuated for rivet setting.

Following the ejection air blast the normal continuous air flow resumes through the flexible delivery tube 146. A variable pressure time delay valve 202 (FIG. 12) in a pilot line now shifts the valve 192 to the right as seen in FIG. 12 whereby a spring-returned piston in a gate operating cylinder 204 (FIGS. 1, 3 and 12) on the tool is actuated, its piston rod 206 engaging and pivoting the gate 154 clockwise as seen in FIG. 3 against the resistance of a leaf spring 207 secured on the tube 68. Thus the mandrel rivet waiting at the gate projection 152 is released and now blown through the advanced tube 68 and into an axial position determined by the rivet catcher 86 as shown in FIG. 7. FIGS. 5 and 9 illustrate how the catcher is formed with an aperture having a smaller opening 208 (smaller than the rivet flange but larger than the diameter of the rivet barrel) merging into a larger opening 210 (larger than the diameter of the rivet flange), and a cam end 212 for cooperating with an inclined wall 214 formed in the anvil member 42. A spring 216 (FIGS. 4–6 and 9) recessed in the anvil member 40 urges the cam end 212 against the wall 214. Initially the delivered mandrel rivet flange bears on the inside of the catcher as shown in FIG. 7, the mandrel extending through the smaller opening 208.

The next stage in the cycle occurs when the operator releases the depressed thumb trigger 174 to restore the valve 176 to its exhaust-blocked position and thereby shifts the valve 178 to its position shown in FIG. 12. The carrier tube 68 is accordingly now pneumatically retracted from the nose assembly to its position indicated in FIG. 8 permitting the jaws 60, 60 and the anvil members 40, 42 to close on the mandrel rivet. Closing of the anvil members 40, 42 allows the cam portion 212 of the rivet catcher 46 to slide down on the wall 214, the larger opening 210 then exposing the rivet barrel and coming on the opposite side of its flange as indicated in FIG. 8. The jaw leaf springs 78 enable the jaws to prevent escape of the fastener to be set which may now be thrust by the tool into the work piece hole where setting is to be effected. As previously described, rivet setting will be performed as shown in FIG. 10 to complete the cycle as a result of depressing the finger trigger 94, the trigger actuation simultaneously signaling for the endmost mandrel rivet in the raceway 134 to be delivered to the gate position shown in FIG. 3.

If desired the tool may be converted to a bench model to free both hands of an operator, the finger and thumb triggers 94, 174 respectively being replaced by treadle actuating means (not shown). In either arrangement rapid insertions and settings of successive rivets may be obtained with very little care or exertion being required of the operator. The tool is reliable and, with the exception of one unlikely situation to be mentioned, is jam-free. It is possible to jam the tool if an unpulled rivet is left therein when the main air supply is turned off. This is because when the air is turned on again a power pulse to the separator could cause it to release and deliver a rivet. The last rivet in the tool should therefore always be set before shutting off the air supply. While a solution to this remote possibility of jamming can be provided with minor change in design it has been found quite unnecessary when the operating precaution noted is observed.

Briefly reviewing a normal cycle of operation, it con sists essentially of three stages. First, an operator depresses the trigger 94 to pull and break a mandrel M in the nose assembly 34 and thereby set its rivet R in a hole in a work piece. This movement of the control member 94 incidentally operates the separator 24 pneumatically to send the next mandrel rivet to be set from the feeder raceway 134 to the gate projection 152 on the retracted carrier tube 68. Secondly, the operator depresses the thumb trigger 174 to advance the tube 68 and thereby open the jaws 60 and the anvil members 40, 42. This action is automatically followed by the blast from the accumulator 190 to eject the spent mandrel stem, release of the mandrel rivet to endmost position in the separator, and operation of the gate operating rod 206 to release the next mandrel rivet to be set for delivering from the gate projection 152 to the catcher 86. Thirdly and lastly, release of the depressed thumb trigger 174 effects retraction of the carrier tube 68 to close the anvils 40, 42 and the jaws 60 and to shift the catcher 86 thereby preparing the tool for repeating its operating cycle. Thus tedious and time consuming manual placement of individual mandrel rivets is avoided, and much higher rates of installation attained with little effort.

Having thus described our invention, what we claim as new and desire to secure by Letters Patent of the United States is:

1. Apparatus for successively setting separable mandrel rivets comprising a tool having a hollow body and an anvil end, means in the body adjacent to said end for gripping and tensioning the mandrel of a rivet to be set, and means connected to the tool and under the control of an operator for successively delivering mandrel rivets from a random supply to the gripping and tensioning means, and other means on the tool under the control of the operator for operating the gripping and tensioning means.

2. In a tool for setting separable mandrel rivets, a hollow body having an anvil end and mandrel gripping and tensioning means movably related thereto, means under the control of an operator for delivering successive mandrel rivets through the body to the anvil end, and means mounted on the body for releasably retaining each delivered mandrel rivet with its mandrel in position to be gripped by the gripping and tensioning means and its rivet in position to be engaged endwise by the anvil end.

3. A tool as set forth in claim 2 and further characterized in that said means for delivering the successive mandrel rivets comprises a separator associated with a source of supply of the mandrel rivets, a tube in the tool for receiving successive mandrel rivets rivet-end first from the separator, and fluid pressure means for operating the separator and delivering the successive mandrel rivets through the tube.

4. In a tool for successively setting separable mandrel rivets, a hollow main body having a yieldingly openable anvil end, mandrel gripping and tensioning means including a pair of cooperative, yieldingly openable jaws retractable in the body from the anvil end, mechanism for operating the mandrel gripping and tensioning means, a mandrel rivet carrying member reciprocable in the body relative to the anvil end and the jaws, and power means for moving the mandrel rivet carrying member toward the anvil end to deliver thereto a mandrel rivet having its mandrel stem in position to be gripped by said jaws for tensioning.

5. A tool as set forth in claim 4 wherein the mandrel rivet carrying member is a tube adapted upon movement in one direction to open the jaws and the anvil end for pneumatic delivery endwise thereto of a mandrel rivet.

6. A tool as set forth in claim 4 and further characterized in that the anvil end comprises a pair of complemental anvil members forming a mandrel rivet receiving aperture bounded by an external surface adapted to engage a preformed flange of the rivet, and a rivet catcher movably mounted on one of the anvil members, said catcher being adapted in the opened condition of the anvil members to be engaged by one side of the flange of the delivered rivet and, in their closed condition, to permit the opposite side of the rivet flange to be engaged by said external anvil surface.

7. In a separable mandrel riveter, a nose assembly comprising anvil members forming a mandrel receiving aperture and radially yieldable with respect to the axis of said aperture, cooperative mandrel gripping and tensioning jaws movable in the assembly toward and from the aperture, means urging the jaws into closed mandrel gripping relation, a fluid pressure operated cage relatively movable within the anvil members along the axis of said aperture and adapted, in one direction, to bear on said jaws to cause them to clamp and tension the stem of a mandrel rivet to be set, a tubular mandrel rivet carrier movable in the assembly to cam open the jaws and the anvil members preparatory to delivering a mandrel rivet thereto, and fluid pressure means for delivering successive mandrel rivets via said tubular carrier to position them respectively in said aperture.

8. A riveter as set forth in claim 7 wherein control members operable at the will of an operator are provided for sequentially actuating said fluid pressure operated cage, said fluid pressure rivet delivering means, and the mandrel rivet carrier.

9. In apparatus for setting separable mandrel rivets, a tool body having an apertured anvil end, mandrel gripping and tensioning means including a cage movable in the body toward and from the anvil end, a tubular mandrel-pulling piston operatively connected to said cage, a tubular mandrel rivet carrier slidable axially in said piston between a rivet receiving position and a rivet delivering position adjacent to said anvil end, fluid pressure operated means for delivering successive mandrel rivets from a source of supply to said carrier in its rivet receiving position, fluid pressure operated means for operating said piston, and manual control means on said tool body for sequentially actuating both of said fluid pressure operated means, the tubular carrier being vented in its rivet receiving position but unvented in its rivet delivering position whereby a spent mandrel of a previously set mandrel may be blown from the tool body.

10. In apparatus for setting separable mandrel rivets, a tool body, a pair of yieldingly separable members mounted on the body and having complemental anvil ends formed to receive the successive mandrel rivets to be set, a pair of cooperative mandrel gripping and tensioning jaws pivotally supported by said members, respectively, a tubular mandrel pulling piston operatively connected to said jaws to move them relatively to said anvil ends, a mandrel rivet carrier reciprocably mounted in the piston for opening and closing the jaws and said members and delivering each mandrel rivet thereto when they are in open condition, and means adjacent to said anvil ends and responsive to the movement of said carrier for positioning the delivered mandrel rivets successively endwise with respect to said anvil ends.

11. Apparatus as set forth in claim 10 wherein a pneumatic mandrel feeding means is adapted to supply successive rivets to said carrier, and manually controlled means on the tool body for operating said piston is adapted to signal for the next rivet to be set to be sent to the body from said feeding means.

12. Apparatus for successively installing separable mandrel rivets comprising a tool having an anvil end formed to abut the preformed flanges of successive rivets to be set by tensioning of their mandrels, a carrier tube movable in the tool between a mandrel rivet receiving position and a delivery position adjacent to the anvil end, mandrel gripping and tensioning means in the tool reciprocable toward and away from said delivery position to tension and break the stem of each delivered mandrel, fluid pressure means under the control of an operator for moving the carrier tube between its receiving and delivering positions, other fluid pressure means under the control of the operator for ejecting the successive broken mandrel stems and thereafter delivering through the carrier tube the next mandrel rivet to be set, and means mounted adjacent to the anvil end of the tool for intercepting said next mandrel rivet to position it endwise with respect to the mandrel gripping and tensioning means.

13. Apparatus as set forth in claim 12 wherein said intercepting means is a spring-pressed lever provided with a cam shaped end for cooperating with said anvil end, the lever having a mid portion formed with an opening having a diameter smaller than that of the rivet flange but larger than that of the rivet barrel, said opening merging into a larger aperture having a diameter greater than that of the rivet flange.

14. In apparatus for setting separable mandrel rivets, the combination with a tool having a pair of yieldingly openable anvil members and a pair of yieldingly openable mandrel gripping and tensioning jaws, of a mandrel rivet carrier tube movable axially in the tool between a rivet receiving position and a rivet delivering position, said tube being arranged and adapted to open the anvil members and the jaws in advancing to its rivet delivering position.

15. Apparatus as set forth in claim 14 wherein rivet catcher means movably mounted on the tool is responsive to retraction of the tube toward its rivet receiving position to shift the catcher means from a rivet flange engaging position to allow the anvil members to be engaged by the flange of the rivet to be set.

16. Apparatus as set forth in claim 14 and further characterized in that said carrier tube is provided with a movable gate arranged to be closed when the tube is in its rivet receiving position, mandrel rivet feeding means comprising a source of supply and associated separator means is provided, said feeding means being in communication with said tube, and means on the tool under the control of an operator for effecting actuation of said mandrel gripping and tensioning jaws is adapted to operate said separator means to deliver a mandrel rivet for engagement with said gate.

17. In apparatus for setting separable mandrel rivets, a tool having an apertured anvil end and spring-pressed mandrel gripping and tensioning jaws, a reciprocable tube extending in the tool for spreading the jaws apart and delivering a mandrel rivet, mandrel head first, into position to be gripped by the jaws, fluid pressure means for controlling jaw opening movement of the tube, and pneumatic means under the control of an operator for blowing successive mandrels through the tube and between said jaws with their rivet portions extending, respectively, in said apertured anvil end.

18. Apparatus as set forth in claim 17 and further characterized in that said reciprocable tube is in communication with a pneumatically pressurized supply line, a mandrel rivet feeder is provided as a source of the mandrel rivets to be fed into said line, and a separator associated with said feeder and operatively connected to said supply line is adapted to be actuated by a control member on the tool.

19. Apparatus as set forth in claim 17 wherein a tubular mandrel pulling piston is disposed in the tool and operatively connected to said jaws, said piston being arranged to guide the operating movement of said tube.

20. Apparatus for successively feeding from a supply and setting separable mandrel rivets comprising a hand-held tool having a yieldably openable anvil end defining an aperture, said tool being formed with a grip portion and a cylindrical bore coaxial with said aperture, a pair of cooperative mandrel gripping and tensioning jaws movably mounted in the tool between the anvil end and said cylindrical bore, means urging the jaws into mandrel gripping relation, fluid pressure operated means including a movable cage engageable with said jaws and a mandrel pulling tubular piston connected to the cage and operative in said bore, a tubular mandrel carrier axially slidable in the mandrel pulling piston, fluid operated means for axially shifting the carrier to open and close the jaws and said anvil end and to eject a previously spent mandrel from the jaws before delivering the next mandrel rivet to be set, fluid pressure operated means for blowing successive mandrel rivets from said supply to the tube, and a pair of triggers movably mounted on said tool grip portion for operating the several fluid pressure operated means in sequence.

21. Apparatus as set forth in claim 20 wherein a catcher is movably mounted externally on the anvil end of the tool and automatically shiftable to a position for engaging the flange of a rivet to be set when the mandrel rivet is delivered by the tube.

References Cited

UNITED STATES PATENTS

| 2,526,956 | 10/1950 | Kugler | 72—411 |
| 2,999,610 | 9/1961 | Gapp | 72—391 |
| 2,879,509 | 3/1959 | Congdon | 227—112 |
| 3,186,616 | 6/1965 | Weems | 227—8 |
| 3,283,985 | 11/1966 | Willis | 227—112 |

FOREIGN PATENTS

| 115,317 | 6/1942 | Australia. |
| 447,919 | 4/1948 | Canada. |

CHARLES W. LANHAM, *Primary Examiner.*

GENE P. CROSBY, *Assistant Examiner.*